United States Patent
Lee et al.

(10) Patent No.: US 8,339,631 B2
(45) Date of Patent: Dec. 25, 2012

(54) IMAGE FORMING APPARATUS AND WARMING UP METHOD THEREOF

(75) Inventors: Sang-jin Lee, Suwon-si (KR); Gun-il Lee, Yongin-si (KR); Seung-kyoon Shin, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 572 days.

(21) Appl. No.: 12/535,832

(22) Filed: Aug. 5, 2009

(65) Prior Publication Data

US 2010/0085592 A1    Apr. 8, 2010

(30) Foreign Application Priority Data

Oct. 7, 2008    (KR) .................................. 2008-98373

(51) Int. Cl.
G06F 15/00    (2006.01)
G06F 7/04    (2006.01)

(52) U.S. Cl. ......................................... 358/1.14; 726/19
(58) Field of Classification Search .................. 358/1.14
See application file for complete search history.

(56) References Cited

U.S. PATENT DOCUMENTS

2006/0143706 A1* 6/2006 Kawasaki et al. ................ 726/19
2008/0266588 A1* 10/2008 Inaba ........................... 358/1.13

FOREIGN PATENT DOCUMENTS

KR    2007-77133    7/2007

* cited by examiner

Primary Examiner — Saeid Ebrahimi Dehkordy
(74) Attorney, Agent, or Firm — Staas & Halsey LLP

(57) ABSTRACT

An image forming apparatus having a plurality of operations and a warming up method thereof, the image forming apparatus including: a user interface to receive a setting of a usage right of a user for a plurality of operations of the image forming apparatus and a login of the user while the image forming apparatus is in a power save mode; and a controller to perform a warming up for at least one operation corresponding to the usage right according to the login.

19 Claims, 3 Drawing Sheets

IMAGE FORMING APPARATUS AND WARMING UP METHOD THEREOF

CROSS-REFERENCE TO RELATED APPLICATION

This application claims benefit of Korean Patent Application No. 2008-98373, filed Oct. 7, 2008 in the Korean Intellectual Property Office, the disclosure of which is incorporated herein by reference.

BACKGROUND OF THE INVENTION

1. Field of the Invention

Aspects of the present invention relate to an image forming apparatus in which a usage right is set according to user accounts, and a method of warming up the image forming apparatus.

2. Description of the Related Art

In general, an image forming apparatus may be embodied as a printer, a copier, a facsimile, or a multi function printer to print an image on a print medium (such as paper). As multiple operations have recently been integrated into one device, the multi function printer has also extended its operations.

Such a multi function image forming apparatus is generally connected to a plurality of user computers through a network. In this case, in order to prohibit an unauthorized user from using the image forming apparatus or a specific operation of the image forming apparatus, user accounts are set for the image forming apparatus to give a usage right to an authorized user allowing the user to use the image forming apparatus or the specific operation thereof.

Furthermore, such an image forming apparatus has a power save mode in which power is cut off to some components thereof to save power when printing is not performed for a specific time. In order to perform printing in the power save mode, the components to which power is cut off should be restored into a normal mode. To this end, warming up is needed.

However, the image forming apparatus in which the user accounts are set performs the warming up for all of the operations thereof regardless of the usage right. Similarly, when initial power is supplied to the image forming apparatus, the image forming apparatus performs the warming up for all of the operations thereof regardless of the usage right.

Typically, the warming up operation takes much time and power. Thus, the warming up for all of the operations regardless of the usage right in the image forming apparatus in which user accounts are set causes unnecessary consumption of time and power, and simultaneously causes inconvenience to a user.

SUMMARY OF THE INVENTION

Aspects of the present invention provide an image forming apparatus that selectively performs warming up for an operation corresponding to a usage right of a user to thereby prevent unnecessary consumption of time and power and user inconvenience, and a method of warming up the image forming apparatus.

According to an aspect of the present invention, there is provided a method of warming up an image forming apparatus having a plurality of operations, the method including: setting a usage right of a user for the plurality of operations of the image forming apparatus; receiving a login of the user by the image forming apparatus in a power save mode; and performing a warming up for at least one operation corresponding to the usage right according to the login.

The method may further include displaying a screen for the login in the power save mode.

The setting of the usage right may include setting the usage right by the image forming apparatus or an external apparatus connected to the image forming apparatus.

The performing of the warming up may include returning the at least one operation to a normal mode from the power save mode.

The plurality of operations may include printing, scanning, feeding, discharging, and/or data communication operations.

The method may further include displaying the at least one operation corresponding to the usage right of the logged in user.

The method may further include displaying, if the user has the usage right for a plurality of operations, the plurality of operations for the user to select the at least one operation therefrom.

According to another aspect of the present invention, there is provided an image forming apparatus having a plurality of operations, the apparatus including: a user interface to receiving a setting of a usage right of a user for a plurality of operations of the image forming apparatus and a login of the user while the image forming apparatus is in a power save mode; and a controller to perform a warming up for at least one operation corresponding to the usage right according to the login.

The apparatus may further include a display unit to display a screen for the login in the power save mode.

The apparatus may further include a communication unit to connect to an external apparatus, wherein a command to set the usage right is received from the external apparatus.

The image forming apparatus may return to a normal mode from the power save mode by the warming up.

The at least one operation may include printing, scanning, feeding, discharging, and/or data communication operations.

The display unit may display the at least one operation corresponding to the usage right of the logged in user.

The display unit may display a plurality of operations for the user to select the at least one operation therefrom according to the usage right of the user.

According to another aspect of the present invention, there is provided a method of setting a usage right in an image forming apparatus having a plurality of operations, the method including: setting a usage right of a user for the plurality of operations of the image forming apparatus; and storing the set usage right, wherein the usage right defines one or more authorized operations for the user, such that when the user requests an operation of the image forming apparatus while the image forming apparatus is in a power save mode, a warming up of the operation is performed if the operation is an authorized operation for the user according to the usage right.

According to yet another aspect of the present invention, there is provided a method of warming up an image forming apparatus having a plurality of operations, the method including: receiving a request, from a user, for an operation of the image forming apparatus while the image forming apparatus is in a power save mode; and performing a warming up for the operation if the operation is set as an authorized operation in a usage right corresponding to the user.

According to still another aspect of the present invention, there is provided an image forming apparatus having a plurality of operations, the image forming apparatus including: a user interface to receive a request, from a user, for an operation of the image forming apparatus while the image forming apparatus is in a power save mode; and a controller to perform a warming up for the operation if the operation is set as an authorized operation in a usage right corresponding to the user.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION OF THE EMBODIMENTS

Figure 1:
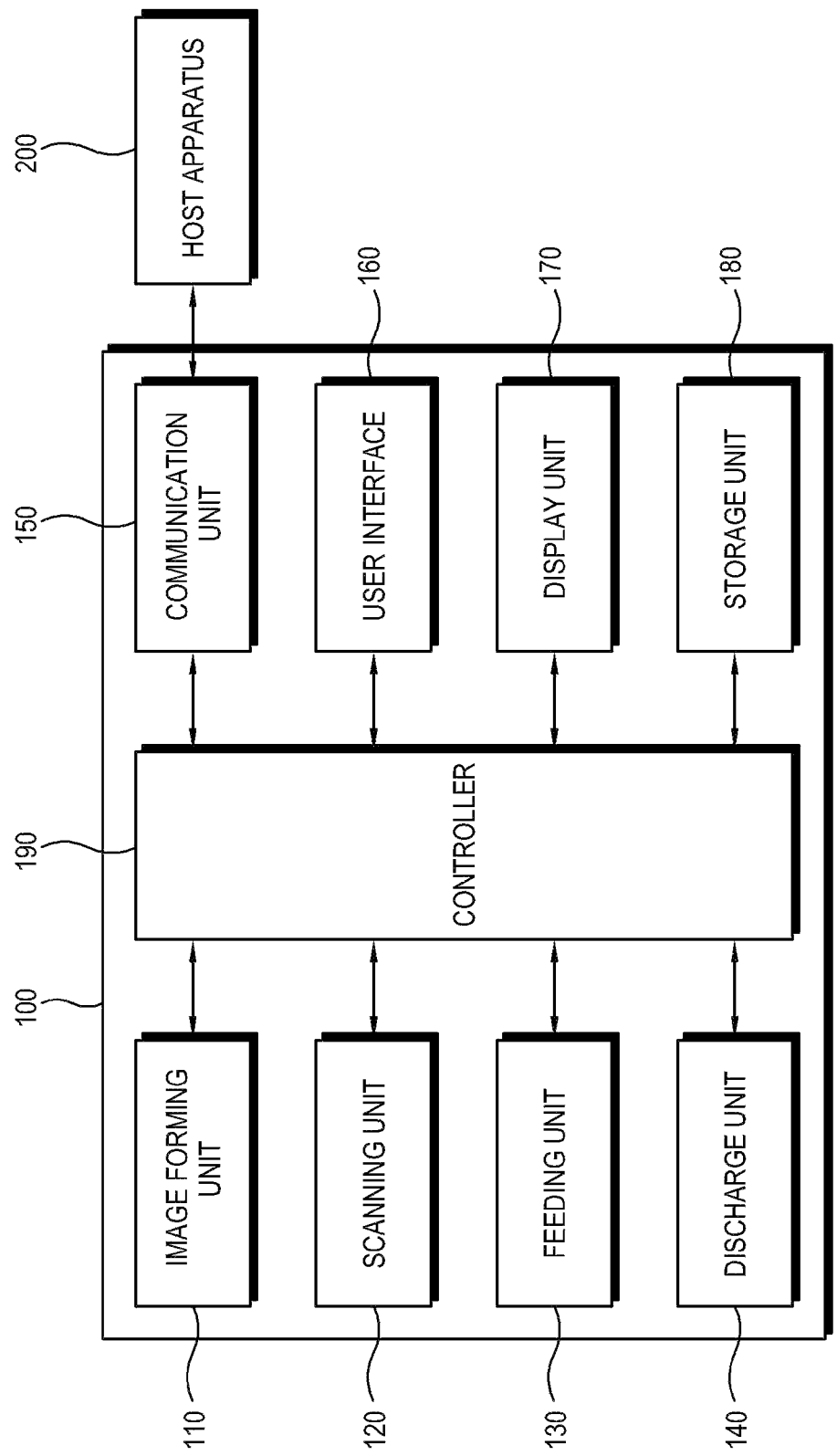
FIG. 1 is a block diagram illustrating an image forming apparatus according to an embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures. Redundant description to different embodiments may be omitted for simplicity of description.

FIG. 1 is a block diagram illustrating a configuration of an image forming apparatus 100 according to an exemplary embodiment of the present invention. The image forming apparatus 100 may be embodied as a printer, a copier, a facsimile or a multi function printer. Referring to FIG. 1, the image forming apparatus 100 is connected to an external host apparatus 200 (such as a personal computer, a laptop computer, a mobile phone, a personal digital assistant, etc.). A user may perform login in an administrator mode through the host apparatus 200 to access the image forming apparatus 100 in order to set and/or change various environments for the image forming apparatus 100. Here, the administrator mode refers to a mode in which the user may set or change environments for the image forming apparatus 100 without limitation.

The image forming apparatus 100 performs printing on at least one print medium (such as paper, transparencies, etc.) for printing data. The image forming apparatus 100 includes an image forming unit 110, a scanning unit 120, a feeding unit 130, a discharge unit 140, a communication unit 150, a user interface 160, a display unit 170, a storage unit 180, and a controller 190.

If a printing command is received, the image forming apparatus 110 forms an image to be printed on at least one print medium on the basis of the printing data. The image forming apparatus 110 may include a printer engine to print the formed image on the printing medium. It is understood that the term "printing" includes a printing operation to copy a scanned document or item, a printing operation for received facsimile data, and a printing operation for print data that is received from an outside source through the host apparatus 200 including a server or that is stored internally (for example, in an HDD) or externally (for example, in a USB memory) in relation to the image forming apparatus 100.

The scanning unit 120 reads a document or item to be scanned and generates a scan image therefrom. Here, the term "document" includes a typical document, a photograph, a film, etc.

The feeding unit 130 supplies a recording medium or a print medium on which an image is to be printed from at least one feeding tray. The feeding unit 130 includes an automatic document feeder (ADF), a duplex automatic document feeder (DADF), a feed cassette, a manual feed tray, and/or an optional tray provided on a side of the image forming apparatus 100.

The discharge unit 140 discharges the print medium on which an image is printed to an outside of the image forming apparatus 100. Furthermore, the discharge unit 140 may perform a post-processing operation for the discharged print medium and may include a stacker, a finisher, a stapler, a sorter, and/or a puncher that collect, stack, and/or classify the discharged print medium and/or staple the classified print medium.

The communication unit 150 performs data communication with an external apparatus (such as the host apparatus 200 and the server). The communication unit 150 may include a wired and/or wireless communication module to connect to the external apparatus via a network by a local or a predetermined protocol, and/or a USB port to connect to the external apparatus and/or a portable storage medium such as a USB memory. Moreover, the communication unit 150 may include a facsimile communication module to change data read by the scanning unit 120 into a facsimile signal for transmission and/or to receive a facsimile signal from an outside source. Also, the communication unit 150 may perform a scan to host operation to transmit the scan data read by the scanning unit 120 to the host apparatus 200, a scan to server operation to transmit the scan data by the scanning unit 120 to the server, and/or a scan to e-mail operation to transmit the scan data to an outside device through an e-mail.

The user interface 160 receives a command from a user. The user interface 160 may include a key button (or a hard key or a keypad), a graphic user interface (GUI), an input device (such as a rotatable dial), and/or a touch screen. The GUI may be generated by executing a printer driver or a separate application and is displayed on the display unit 170 for user input. The user interface 160 receives a command to register a user account of the image forming apparatus 100 (including, for example, an identification (ID) and a password) and a command to set a usage right for the image forming apparatus 100 according to each user account.

Furthermore, the user performs a login process in which, for example, an ID and a password allocated to each user account is received through the user interface 100. Here, the login process may include a login in an administrator mode in which settings and changes for environments of the image forming apparatus 100 are available. In the case that the login is performed in the administrator mode, at least one user account is registered in the image forming apparatus 100 and the usage right is set according to the registered user account. If the login of the user or the login in the administrator mode is performed, the image forming apparatus 100 performs identification and permission for the login. In this way, the image forming apparatus 100 sets a usage right for the user by the login in a normal user mode or may set different usage rights for a plurality of users by the login in the administrator mode.

According to another embodiment of the present invention, a user may perform a login in the administrator mode or the normal user mode in the host apparatus 200 connected to the image forming apparatus 100 through the communication unit 140 to set the usage right for the image forming apparatus 100.

The display unit 170 may display a setting and operation state of the image forming apparatus 100 to the user and may display the GUI screen to receive various commands from the user. The display unit 170 may include a thin film transistor-liquid crystal display (TFT-LCD) and a driving unit (not shown) for driving the TFT-LCD.

If the user logs in, the display unit 170 may display one or more available operations corresponding to the usage right. Here, if the usage right for a plurality of operations is set to the logged in user, the display unit 170 may display the plurality of operations to the user for selection. If the user selects at least one of the displayed operations, the image forming apparatus 100 performs a warming up for the selected operation(s).

The storage unit 180 stores user registration information, user permission information, and/or usage right information that are set according to user accounts. The storage unit 180 may include an internal storage medium such as a hard disc drive (HDD), and/or an external or portable storage medium such as a USB memory, a memory card (memory stick, compact flash card, micro memory card (MMC), etc.). In addition, the storage unit 180 may store print data received from an outside source or a scan image generated through the scanning unit 120.

The controller 190 controls overall operations of the image forming apparatus 100. In particular, the controller 190 performs a wake up operation in which the image forming apparatus 100 returns to a normal mode from a power save mode. Moreover, when initial power is supplied, the controller 190 receives a command for user identification (such as login from the user interface 160) and selectively performs warming up for one or more operations corresponding to a usage right for the identified user. Here, the command for the user identification may include a copy command, a scan command, and/or a facsimile transmission command that the image forming apparatus 100 receives in the power save mode. In addition, the command may include print data that the image forming apparatus 100 receives in the power save mode. If the print data is received in the power save mode, the controller 190 determines the usage right of the logged in user and performs a warming up for the corresponding operation. If there is not a logged in user, the controller 190 may display a message requesting a user to perform login through the display unit 170.

The operation corresponding to the usage right may include a printing operation, a scanning operation, a feeding operation, a discharging operation, or a data communication operation. The printing operation refers to a printing operation through the printer engine of the image forming unit 110. The scanning operation refers to a scanning operation of the scanning unit 120 to scan the document or item with light or laser. The feeding operation refers to an operation of the feeding unit 130 to supply a print medium for image printing from the feeding tray. The feeding operation performs an operation using an ADF, a DADF, a feeding cassette, a manual feeding tray, and/or an optional tray provided on a side of the image forming apparatus 100. The discharging operation refers to an operation of the discharge unit 140 to perform a post-processing operation for the discharged print medium through a stacker, a finisher, a stapler, a sorter, and/or a puncher. The data communication operation refers to an operation to transmit print data or scanning data through the communication unit 150 to an outside device and includes facsimile transmission/reception, scan to host operation, scan to server operation, and/or e-mail transmission.

For example, in the case that a usage right of a user A is set only to the facsimile transmission, if the user A logs in, the controller 190 performs a warming up for the scanning unit 120 and the communication unit 150. Accordingly, the image forming apparatus 100 performs the scanning operation and the data communication operation. On the other hand, in the case that a usage right of a user B is set to the facsimile transmission and confirm report output, if the user B logs in, the controller 190 performs a warming up for the scanning unit 120 and the communication unit 150. Accordingly, the image forming apparatus 100 performs the scanning operation, the data communication operation, and the printing operation. Furthermore, if the user B logs in, the controller 190 may also perform warming up for the feeding unit 130 and the discharge unit 140 for the feeding operation and discharging operation. Here, the feeding unit 130 and the discharge unit 140 may be embodied such that the controller performs warming up for a part of modules according to a feeding and discharging method.

Figure 2:
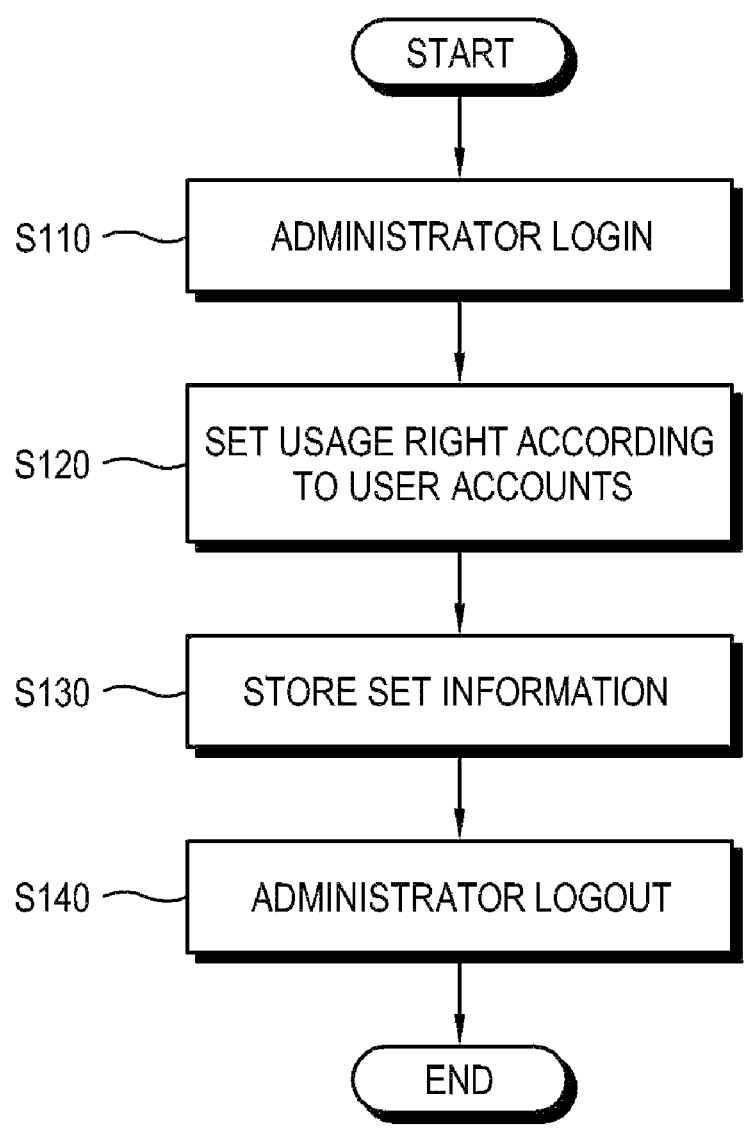
FIG. 2 is a flowchart illustrating a process of setting a usage right according to user accounts according to an embodiment of the present invention.

Hereinafter, a process of setting a usage right and a warming up process according to the usage right in the image forming apparatus 100 will be described with reference to FIGS. 2 and 3. FIG. 2 is a flowchart illustrating a process of setting a usage right according to user accounts according to an embodiment of the present invention. Referring to FIG. 2, a user (or an administrator) performs a login in an administrator or user mode to the image forming apparatus 100 through the user interface 160 in operation S110. Here, the login in the administrator mode may include input and permission of an administrator ID and a password.

In response to the login in the administrator or the user mode being completed (operation S110), the image forming apparatus 100 sets a usage right according to a user account through the user interface 160 in operation S120. Here, the usage right may be directly set by the user or may be set by the administrator for a plurality of users. The usage right may be set corresponding to each operation of the image forming apparatus 100. For example, in the case that the administrator desires to set the facsimile transmission/reception and printing for a user C, the administrator may set the usage right for the printing, scanning and data transmission/reception operations. Furthermore, the administrator may set the usage right for feeding and discharging operation for a user D.

It is understood that, according to other embodiments, the user may perform the login in operation S110 through an external apparatus such as the host apparatus 200 to with the image forming apparatus 100, and may set the usage rights in operation S120 in the external apparatus or the image forming apparatus 100.

The controller 190 stores information about the set usage right in operation S130 and performs logout for the administrator or user mode in operation S140. If a new user account is added or the set user account is changed, the setting process in operations S110 to S140 is repeated.

Accordingly, in the case that the image forming apparatus 100 returns to the normal mode from the power save mode or in the case that the initial power is supplied to the image forming apparatus 100, the controller 190 selectively performs warming up for the image forming apparatus 100 according to the settings of operations S110 to S140. Furthermore, it is understood that one or more of the operations S110 to S140 may be performed by an external apparatus (such as the host apparatus 200 or a printer server) according to other aspects.

Figure 3:
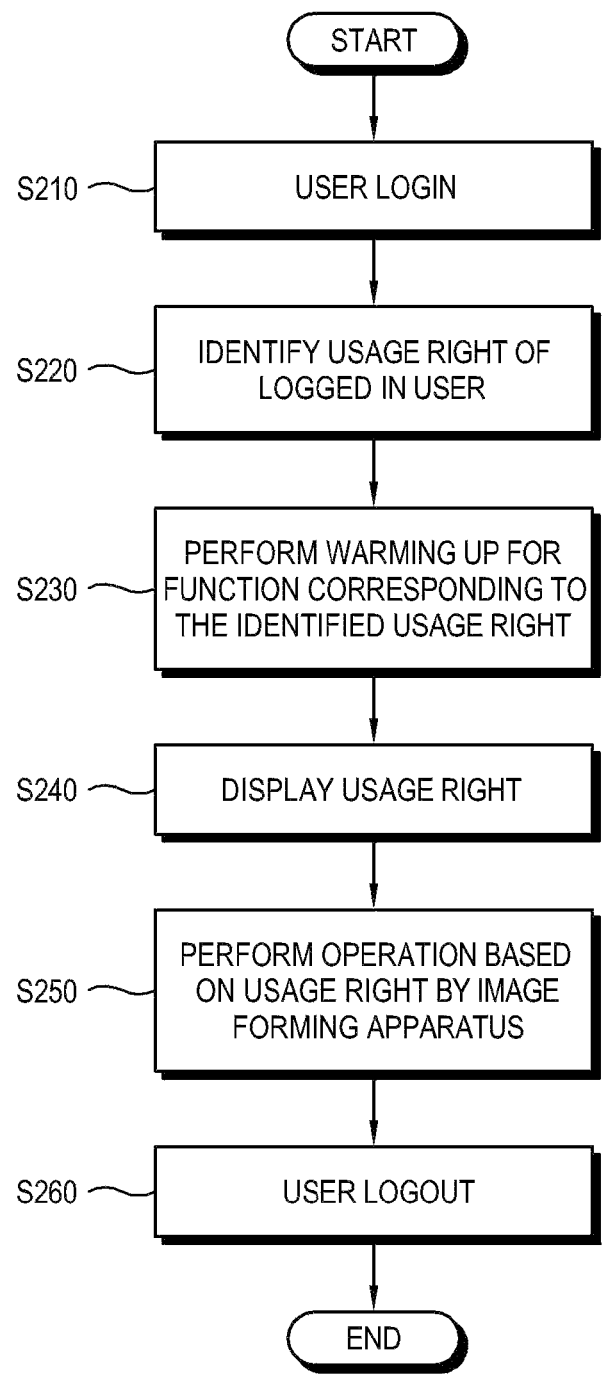
FIG. 3 is a flowchart illustrating a method of warming up an image forming apparatus according to an embodiment of the present invention.

FIG. 3 is a flowchart illustrating a method of warming up an image forming apparatus according to an embodiment of the present invention. The image forming apparatus 100 performs a login through the user interface 160 according to a command for user identification received from a user in operation S210. Here, the login may include input and identification of a user ID and a password. Accordingly, the controller 190 confirms the usage right for the logged in user in operation S220.

The controller 190 selectively performs warming up for one or more operations corresponding to the confirmed usage right in operation S230. Here, the operation(s) may include printing, scanning, feeding, discharging, and/or data communication operations. Furthermore, the controller 190 displays the usage right to the logged in user through the display unit 170 in operation S240. Here, if the usage right for a plurality of operations is set for the logged in user, the controller 190 may control the display unit 170 for the user to select from among the plurality of operations. If the user selects at least one of the displayed operations, the controller 190 performs warming up for the selected operation(s). Then, the image forming apparatus 100 performs printing, scanning, facsimile transmission/reception, and/or copy operations according to the usage right of the user in operation S250. When completed, the image forming apparatus 100 performs logout for the user in operation S260. It is understood that one or more of the operations S210 to S220, S240, and S260 may be performed by an external apparatus (such as the host apparatus 200 or a printer server) according to other aspects.

As described above, the image forming apparatus according to aspects of the present invention sets a usage right according to user accounts and performs warming up for one or more operations corresponding to the set usage right, thereby preventing unnecessary consumption of time and power and user inconvenience.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of warming up an image forming apparatus having a plurality of operations, the method comprising:
    setting a usage right of a user for the plurality of operations of the image forming apparatus;
    displaying a screen for the login in a power save mode;
    receiving a login of the user by the image forming apparatus in the power save mode; and
    performing a warming up for at least one operation corresponding to the usage right according to the login.

2. The method as claimed in claim 1, wherein the setting of the usage right comprises setting the usage right by the image forming apparatus or an external apparatus connected to the image forming apparatus.

3. The method as claimed in claim 1, wherein the performing of the warming up comprises returning the at least one operation to a normal mode from the power save mode.

4. The method as claimed in claim 1, wherein the plurality of operations comprises printing, scanning, feeding, discharging, and/or data communication operations.

5. The method as claimed in claim 1, wherein the displaying the screen comprises displaying the at least one operation corresponding to the usage right of the logged in user.

6. The method as claimed in claim 5, wherein the displaying of the at least one operation comprises:
    displaying a plurality of operations corresponding to the usage right of the logged in user; and
    receiving a selection of one or more operations from among the plurality of operations,
    wherein the performing of the warming up comprises performing the warming up for the selected one or more operations.

7. The method as claimed in claim 1, wherein the setting of the usage right comprises setting the usage right for the user in an administrative mode of the image forming apparatus.

8. The method as claimed in claim 1, further comprising maintaining, in the power save mode, other operations of the image forming apparatus that are not authorized for the user according to the usage right.

9. An image forming apparatus having a plurality of operations, the image forming apparatus comprising:
    a user interface to receive a setting of a usage right of a user for a plurality of operations of the image forming apparatus and a login of the user while the image forming apparatus is in a power save mode;
    a display unit to display a screen for the login in the power save mode; and
    a controller to perform a warming up for at least one operation corresponding to the usage right according to the login.

10. The apparatus as claimed in claim 9, further comprising a communication unit to connect to an external apparatus, wherein a command to set the usage right is received from the external apparatus.

11. The apparatus as claimed in claim 9, wherein the controller performs the warming up by returning the at least one operation to a normal mode from the power save mode.

12. The apparatus as claimed in claim 9, wherein the plurality of operations comprises printing, scanning, feeding, discharging, and/or data communication operations.

13. The apparatus as claimed in claim 9, wherein the display unit displays the at least one operation corresponding to the usage right of the logged in user.

14. The apparatus as claimed in claim 13, wherein:
    the display unit displays a plurality of operations corresponding to the usage right of the logged in user;
    the user interface receives a selection of one or more operations from among the plurality of operations; and
    the controller performs the warming up for the selected one or more operations.

15. The apparatus as claimed in claim 9, wherein the user interface receives the setting of the usage right in an administrative mode.

16. A method of setting a usage right in an image forming apparatus having a plurality of operations, the method comprising:

setting a usage right of a user for the plurality of operations of the image forming apparatus; and storing the set usage right, wherein the usage right defines one or more authorized operations for the user, such that when the user requests an operation of the image forming apparatus while the image forming apparatus is in a power save mode, a login of the user is received in response to a login screen displayed in the power save mode and a warming up of the operation is performed if the operation is an authorized operation for the user corresponding the login according to the usage right.

17. The method as claimed in claim 16, wherein the setting of the usage right comprises receiving a login for one of an administrator of the image forming apparatus and the user.

18. The method as claimed in claim 17, wherein the setting of the usage right and/or the storing of the set usage right are performed in one of an external apparatus connected to the image forming apparatus and the image forming apparatus.

19. A method of warming up an image forming apparatus having a plurality of operations, the method comprising:

receiving a request, from a user, for an operation of the image forming apparatus while the image forming apparatus is in a power save mode;

receiving a login of the user in response to a login screen displayed in the power save mode:

determining the usage right of the logged in user; and performing a warming up for the operation if the operation is set as an authorized operation in a usage right corresponding to the user.

* * * * *